US012728689B2

(12) United States Patent
Guy et al.

(10) Patent No.: US 12,728,689 B2
(45) Date of Patent: Sep. 8, 2026

(54) SUSPENSION BASED ACTIVE FORCE DAMPING FOR A VEHICLE

(71) Applicant: FCA US LLC, Auburn Hills, MI (US)

(72) Inventors: Ashton Guy, Brighton, MI (US); Brian D Dwyer, Ortonville, MI (US); John C St. Pierre, Macomb, MI (US); Parth Rajubhai Shah, Royal Oak, MI (US); Andrew Joseph, Auburn Hills, MI (US); Timothy Rose, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 562 days.

(21) Appl. No.: 18/061,736

(22) Filed: Dec. 5, 2022

(65) Prior Publication Data

US 2024/0181831 A1 Jun. 6, 2024

(51) Int. Cl.
*B60G 17/02* (2006.01)
*B60G 17/019* (2006.01)

(52) U.S. Cl.
CPC .......... *B60G 17/02* (2013.01); *B60G 17/019* (2013.01)

(58) Field of Classification Search
CPC .. B60G 17/02; B60G 17/019; B60G 17/0165; B60G 2300/50; B60G 2400/102; B60G 2400/252; B60G 2500/10; B60G 17/06; F16F 15/002; F16F 15/03
See application file for complete search history.

(56) References Cited

U.S. PATENT DOCUMENTS 4,600,863 A 7/1986 Chaplin et al.
6,254,069 B1 7/2001 Muramatsu et al.
10,836,244 B2 11/2020 Inoue et al.
11,001,268 B2 5/2021 Orzechowski et al.
11,345,209 B1 * 5/2022 Carter .................. B60G 21/055
2013/0166149 A1 * 6/2013 Liu ...................... B60G 17/015
701/37
2019/0001782 A1 * 1/2019 Anderson ........... B60G 17/019
2021/0221264 A1 * 7/2021 Selden ................... B60N 2/502
2024/0100900 A1 * 3/2024 Vente ..................... B60G 17/08

FOREIGN PATENT DOCUMENTS

CN 110758041 A * 2/2020 .......... B60G 17/015
DE 102010029910 A1 12/2011
EP 3867088 B1 * 8/2024 ............ B60G 17/08

OTHER PUBLICATIONS

CN 110758041 English translation (Year: 2025).*

* cited by examiner

*Primary Examiner* — Ramon A. Mercado
*Assistant Examiner* — Paul A Castro
(74) *Attorney, Agent, or Firm* — Jeremy J. Klobucar

(57) ABSTRACT

An active damping system for an electric motor driven vehicle having spaced apart front wheels coupled to the vehicle by suspension components, includes a first sensor, a first actuator and a controller. The first sensor is coupled to one or both of a first front wheel or a suspension assembly for the first front wheel, and the first sensor provides an output indicative of a force on a component to which the first sensor is coupled. The first actuator is coupled to the vehicle and has a movable mass driven by the first actuator. The controller is configured to receive the output from the first sensor and the controller is configured, in response to at least an output from the first sensor that is beyond a threshold, to provide an output to the first actuator to displace the movable mass and at least partially damp vibrations in the vehicle.

20 Claims, 3 Drawing Sheets

SUSPENSION BASED ACTIVE FORCE DAMPING FOR A VEHICLE

FIELD

The present disclosure relates to a suspension based active damping system for a vehicle.

BACKGROUND

Vehicles include wheels coupled to a vehicle chassis by suspension components. The wheels roll over the road or ground and encounter uneven conditions, which causes the suspension components to move relative to the frame and which also transfers forces through the frame to other parts of the vehicle. Especially with electric vehicles, which can be heavy due to the presence of battery packs and motors, the tires of the vehicle may be inflated at relatively high pressure, and the suspension components may be relatively rigid to handle the higher weight, which can lead to higher forces in the frame and a rougher ride for the vehicle occupants.

SUMMARY

In at least some implementations, an active damping system for an electric motor driven vehicle having spaced apart front wheels coupled to the vehicle by suspension components, includes a first sensor, a first actuator and a controller. The first sensor is coupled to one or both of a first front wheel or a suspension assembly for the first front wheel, and the first sensor provides an output indicative of a force on a component to which the first sensor is coupled. The first actuator is coupled to the vehicle and has a movable mass driven by the first actuator. The controller is configured to receive the output from the first sensor and the controller is configured, in response to at least an output from the first sensor that is beyond a threshold, to provide an output to the first actuator to displace the movable mass and at least partially damp vibrations in the vehicle.

In at least some implementations, a second sensor is coupled to one or both of a second front wheel or a suspension assembly for the second front wheel, the second sensor provides an output to the controller where the output is indicative of a force on a component to which the second sensor is coupled, and a second actuator is coupled to the vehicle and having a movable mass driven by the second actuator, and the controller is configured to receive the output from the second sensor and the controller is configured, in response to at least an output from the second sensor that is beyond a threshold, to provide an output to the second actuator to displace the movable mass and at least partially damp vibrations in the vehicle. In at least some implementations, the controller is configured to provide an output to either or both of the first actuator and the second actuator in response to an output from at least one of the first sensor and the second sensor that is beyond a threshold.

In at least some implementations, the first actuator includes a wire coil and an armature, and when electricity is provided to the wire coil, the armature is displaced by an electromagnetic field of the first actuator. In at least some implementations, the armature is formed from or includes a rare earth magnet.

In at least some implementations, the first actuator is coupled to the vehicle at a location between a rear of the vehicle and the first sensor.

In at least some implementations, a vehicle speed sensor has an output communicated with the controller, and wherein the output from the controller is a function of the output from the first sensor and from the vehicle speed sensor. In at least some implementations, a tire pressure sensor has an output communicated with the controller, and the output from the controller is a function of the output from the first sensor and from the tire pressure sensor. In at least some implementations, one or more sensors that provide an indication of vehicle weight have an output that is communicated with the controller, and the output from the controller is a function of the output from the first sensor and from the one or more sensors.

In at least some implementations, a second sensor is associated with the actuator and arranged to provide an output to the controller indicative of a force on the actuator or an area adjacent to the actuator.

In at least some implementations, a method of controlling an actuator to damp forces in a vehicle, includes the steps of:

sensing a force with a first sensor coupled to one or both of a first front wheel or a suspension assembly for the first front wheel;

communicating the force with a controller; and providing an output from the controller, at least when the force exceeds a threshold, to a first actuator coupled to the vehicle and having a movable mass driven by the first actuator, whereby the output from the controller causes the first actuator to displace the movable mass and at least partially damp vibrations in the vehicle.

In at least some implementations, the output from the controller is a function of the output from the first sensor and from one or more sensors indicative of a vehicle speed, tire pressure, vehicle steering angle, and vehicle weight. In at least some implementations, the output from the controller is adjustable in an open loop control scheme based upon an output sent to the controller from a second sensor associated with the first actuator. In at least some implementations, if the output from the second sensor indicates a force above a threshold exists at the second sensor after the first actuator has been actuated, then the controller provides another output to actuate the first actuator again.

In at least some implementations, a second sensor is coupled to one or both of a second front wheel or a suspension assembly for the second front wheel, and which includes communicating the output from the second sensor with the controller and wherein the controller provides an output to the first actuator as a function of the output from both the first sensor and the second sensor. In at least some implementations, a second actuator is provided and wherein the controller provides an output to the second actuator to actuate the second actuator as a function of the output from both the first sensor and the second sensor. In at least some implementations, the output provided to the second actuator is different than the output provided to the first actuator.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
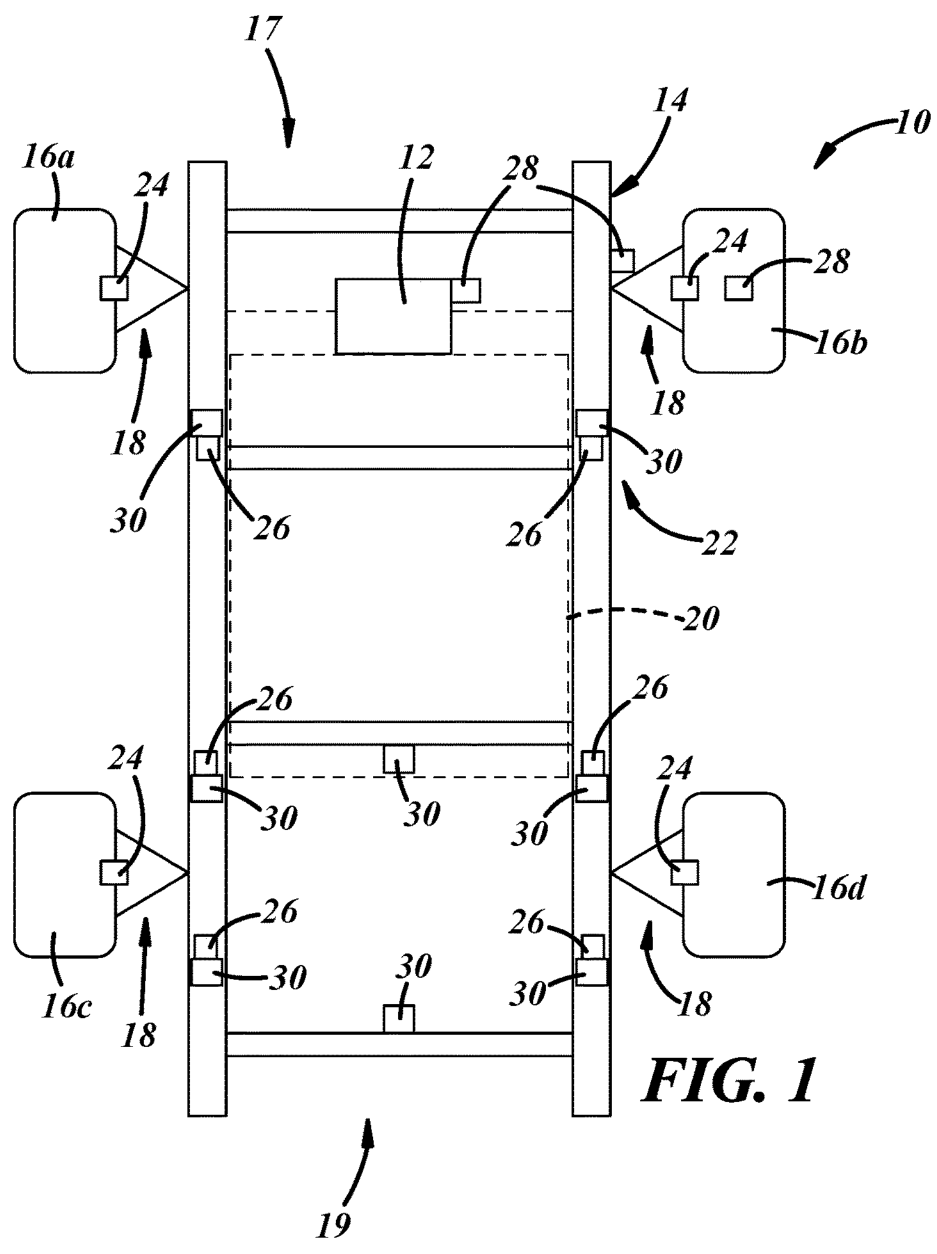
FIG. 1 is a diagrammatic view of a vehicle frame 14, including wheels and associated suspension assemblies coupling the wheels to the vehicle frame 14.

Referring in more detail to the drawings, FIG. 1 illustrates part of a vehicle 10 driven by one or more electric motors 12 and having a chassis or frame 14 and multiple wheels. In the implementations shown, the vehicle includes four wheels 16*a-d* with two front wheels 16*a* and 16*b* adjacent to a front 17 of the vehicle 10 and spaced apart in a cross-car direction, and two rear wheels 16*c* and 16*d* adjacent a rear 19 of the vehicle and spaced apart from each other in a cross-car direction and from the front wheels 16*a-b* in a fore-aft direction. Each wheel 16 may be mounted to a suspension assembly 18 to permit movement of the wheels 16 relative to the vehicle frame 14 in response to travel over uneven surfaces. Due to the higher weight of batteries 20 and related components for electric vehicles, tires on the wheels 16 are often inflated to higher pressures and correspondingly higher forces and vibrations are transferred from the wheels 16 to the suspension assemblies 18 connected to the wheels 16, and to body/frame 14 components to which the suspension components are attached. The higher forces result in a rougher, less smooth ride quality for the vehicle 10, which can negatively impact the driving experience, as vibrations may be felt through, for example, seats, floors, pedals and steering wheel.

Figure 2:
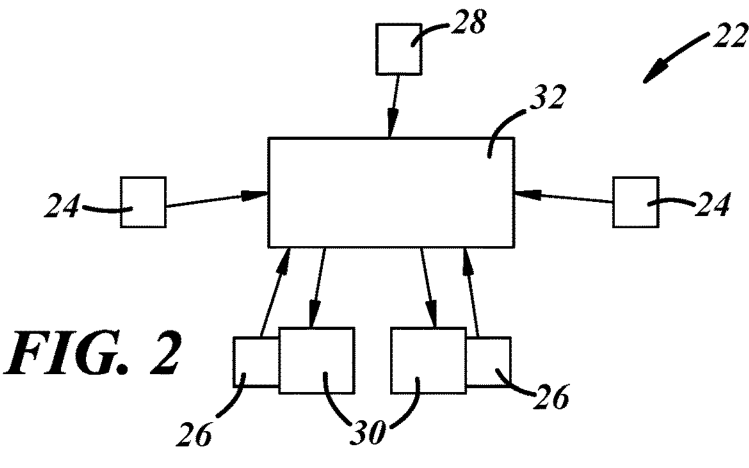
FIG. 2 is a diagrammatic view of a damping system 22 for the vehicle including sensors, actuators and a controller 32.

In at least some implementations, to reduce vibrations or forces transmitted in the vehicle 10, a damping system 22 is provided. As shown in FIGS. 1 and 2, the damping system 22 includes one or more sensors 24, 26, 28, at least one actuator 30 and a controller 32 having an input communicated with the sensor(s) 24, 26, 28 and an output communicated with the actuator(s) 30 to control the actuator(s) 30 as a function of the input(s) from one or more of the sensor(s) 24, 26, 28.

A first sensor 24 may be coupled to a vehicle suspension assembly 18 associated with a vehicle wheel 16, or to the vehicle wheel 16, and is responsive to forces input to the vehicle via the vehicle wheel 16, due, for example, to uneven surfaces over which the wheels 16 travel. In at least some implementations, the sensor 24 is an accelerometer, such as (but not limited to) a digital MEMS accelerometer. In at least some implementations, at least part of and up to all of the sensor 24 is coupled to a component of the suspension assembly 18 that moves relative to the vehicle frame 14 so that such part or all of the sensor 24 moves with the movable suspension assembly 18 component and relative to the vehicle frame 14. To communicate its output with the controller 32, the sensor 24 is coupled to the controller 32 (by wired or wireless connection), and the controller 32 may be dedicated to the damping system 22 or the controller 32 may also function to control other systems of the vehicle 10, as desired.

In at least some implementations, the sensor 24 is mounted near or associated with the forward most or front wheels 16*a-b* of the vehicle 10, where forward indicates the direction of intended primary vehicle travel (i.e. the vehicle 10 may go in reverse and turn, but primarily travels forward). In many situations, the rear wheels 16*c-d* travel over the same area of a road as the front wheels 16*a-b* with some separation in time due to the spacing of the rear wheels from the front wheels 16*a-b*. Accordingly, forces at the front wheels 16*a-b* can be predictively assumed to occur soon after at the rear wheels 16*c-d*, at least when the vehicle 10 is traveling in a mostly straight, forward direction. In at least some implementations, one sensor 24 is associated with a first, front wheel 16*a* of the vehicle 10, and a second of these sensors 24 is associated with a second, front wheel 16*b* of the vehicle 10 where the front wheels 16*a-b* are spaced apart in the cross-car direction that is perpendicular to the primary, forward direction of travel. By way of non-limiting examples, the sensors 24 may be mounted to a hub of the wheel or an upper or lower control arm, by way of some non-limiting examples.

Figure 4:
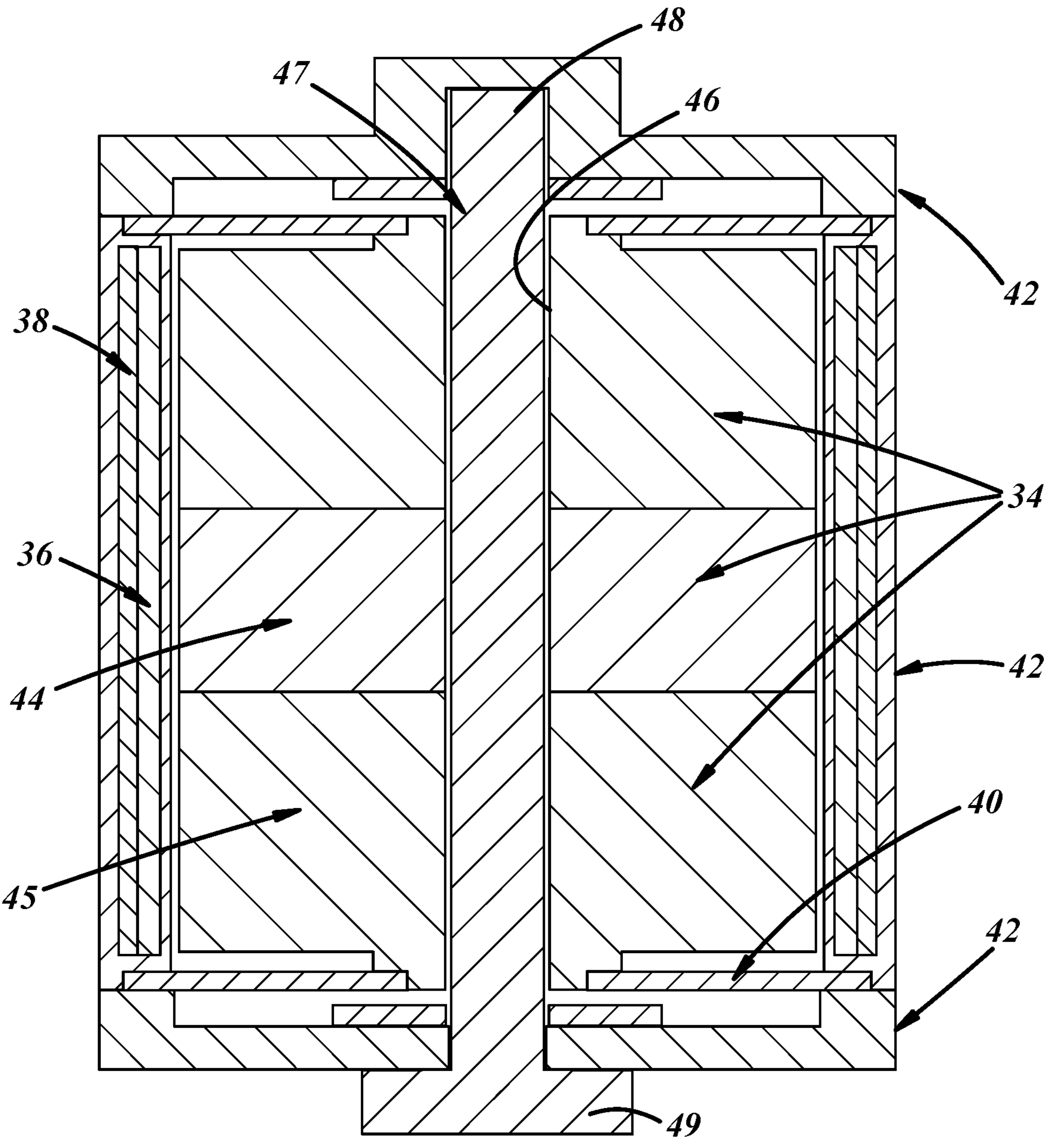
FIG. 4 is a cross-sectional view of an electromagnetic actuator that may be used in the damping system 22.

As shown in FIG. 4, each actuator 30 may be an electromechanical device having an armature 34 driven between first and second positions by an electromagnetic field generated by application of electricity to a wire coil 36 which may be wrapped around a bobbin 38. The armature 34 may be in a first position when electricity is not applied to the coil, and the armature 34 may be driven to a second position when electricity is applied to the coil 36. In this regard, in at least some implementations, the armature 34 may be yieldably biased to the first position, such as by one or more springs 40 that, in the absence of a stronger force on the armature 34, retains the armature 34 in or moves the armature 34 to the second position. By cycling electricity to the coil 36, the armature 34 may be driven back and forth at any desired rate or frequency. In the implementation shown in FIG. 4, two springs 40 are provided that bias the armature 34 in different directions, and the armature may move in either direction against the force of the springs. While shown as flexible plates or discs, the springs could be coil springs or other desired type of spring.

In at least some implementations, each actuator 30 is coupled to the vehicle frame 14, such as a side rail, cross-member, or other structural member of the frame 14, and at least one actuator is located behind the front wheels 16*a-b* relative to the forward direction of vehicle travel. Here, the word "frame 14" is intended to mean a structural assembly of the vehicle whether that is a unibody or ladder frame 14 or other type. As generally shown in FIG. 1, multiple actuators 30 may be provided on the vehicle, and the actuators 30 may be between the front wheels 16*a-b* and rear wheels 16*c-d*, or behind the rear wheels 16*c-d* (relative to the direction of forward travel) or both, as desired, and one or more actuators may be located forward of the front wheels 16*a-b* if desired. The number and locations of the actuators may be chosen as desired for a particular application, the numerous actuators and positions shown in FIG. 1 are merely representative of some possibilities—actuators can be in additional or different positions as desired. Any number of actuators, including one or more than one, can be used in any desired combination or separately, as desired. In at least some implementations, an actuator 30 is mounted to the frame 14 at a location closer to the rear wheels 16*c-d* and rear suspension assembly 18 than the front wheels 16*a-b* and front suspension assembly 18, and actuators 30 may be located within six to eighteen inches of the rear wheels 16*c-d*.

The actuators 30 include a housing 42 that may be directly connected to the vehicle frame 14 such as by bolts, and may be rigidly coupled to the frame 14 so that forces are directly transferred between the frame 14 and actuator with minimal damping (e.g. as may be caused by a coupling that includes elastic bushings or the like). The housing 42 may be coupled to the frame 14 so that the natural frequency of the actuator 30 when connected to the frame 14 is greater than the highest operating frequency of the actuator 30.

In at least some implementations, the actuator 30 includes a magnet 44, such as a rare earth magnet 44 arranged to be acted on or responsive to the electromagnetic field generated by the coil 36. In at least some implementations, the magnet 44 is attached to a ferromagnetic mass 45 to define the armature 34. In the example shown in FIG. 4, the armature 34 includes a passage 46 through which a shaft 47 is be received, and movement of the armature 34 is guided by the shaft 47. The shaft 47 may also couple together different parts of the housing 42, if desired (e.g. the shaft 47 may be a bolt having threads at one end 48 and a head 49 at the other end that overlies part of the housing 42). The magnet 44 may improve the rate of movement or responsiveness of the armature 34 as compared to an armature 34 formed only of a ferromagnetic material. The armature 34 has mass and movement thereof generates a force that is transferred to the vehicle 10 through the housing 42.

To monitor forces or vibrations of the actuator housing 42 or adjacent area of the vehicle frame 14, one or more sensors 26 may be mounted to the frame 14 adjacent to the housing 42, or mounted on or to the housing 42, or both. The sensor(s) 26 may be of the same type as the sensors 24 associated with the suspension assemblies 18 and described above, or a different type of sensor, as desired. The sensor(s) 26 associated with the frame 14 and/or housing 42 may be communicated with the same controller 32 as the other sensors, or a different controller, as desired, so that the controller 32 receives the output from the sensor(s).

The controller 32 receives output from the sensor(s) 24, 26 that is indicative of certain parameters of vibrations or forces experienced at the suspension assembly 18. Such parameters may include, but are not limited to, the start time, duration, magnitude, rate of change of the vibrations/forces in the area of the sensors 24, 26. In addition to different vibrational force magnitudes and frequencies, there are also different types of forces. These include, for example, vibrations or forces that are oriented laterally (cross-car direction, between left and right sides of vehicle) or longitudinally (fore-aft direction, between front and rear of vehicle), vertically (perpendicular to the ground), and rotational, twisting, or torsional vibrations that are a combination of parallel and perpendicular to the ground. In response to those inputs to the controller 32, the controller 32 generates output control signals that are provided to one or more actuator(s) 30 to cause the one or more actuators 30 to drive their respective armatures 34 to generate offsetting or canceling forces and thereby damp or reduce the magnitude of the forces transferred along the vehicle frame 14.

Such forces encountered at the front suspension assembly or assemblies 18 are not known in advance of occurring because the forces occur as and after the front wheels 16*a*-*b* have encountered a road condition causing such forces. Because of this, in at least some implementations, the system does not predict the forces at the front wheels 16*a*-*b* or attempt to damp those forces and instead provides an output from the controller 32 to actuators located rearwardly of the sensors 24 associated with the front wheels 16*a*-*b*/front suspension 18, to damp transmission of forces from the front suspension rearwardly through the frame 14, or to damp forces in the frame 14 that will occur when the rear wheels 16*c*-*d* subsequently encounter the same road condition, or both.

In at least some implementations, the output from the controller 32 to the actuator(s) 30 is determined based upon information other than the output from the sensor(s) 24, 26. For example, vehicle speed may be an input to the controller 32 to, for example, enable determination of when the rear wheels will encounter the road condition already encountered by the front wheels 16*a*-*b*. Steering angle may be an input to the controller 32 to determine the angle or path of travel of the vehicle. Tire pressure may be an input to the controller 32 as forces in the vehicle are different for a given road condition when the tires are inflated at different pressures. The weight of the vehicle may be an input to the controller 32 as a vehicle loaded with cargo and/or passengers may react differently to a road condition than a vehicle carrying less of a load. The weight of the vehicle may be indicated by one or more sensors, as desired. Further, environmental factors like ambient temperature may be an input the controller 32 as the vehicle may react differently to inputs based upon the temperature of the vehicle and its components. The various other sensors are indicated by reference numeral 28 in FIG. 2, and may be implemented individually or in any desired combination of two or more sensors.

The controller output to the actuator(s) 30 may be determined by a processor of the controller 32 as a function of the input(s) received by the controller 32. The controller 32 may be coupled to a memory device or other repository of data from which the controller 32 can determine an output as a function of stored data, which may include, for example, a map or lookup table from which controller outputs may be determined based upon inputs at the controller 32. In this way, the control system for the actuator(s) 30 may be a closed loop system.

The control system could also or instead include an open loop control scheme. In such a control scheme, output to the controller 32 from the sensor(s) 26 at the actuator(s) 30 or adjacent thereto, and/or from the sensors 24, may provide feedback to the controller 32 as to the damping that occurred based upon a given output from the controller 32. If a satisfactory damping was not achieved, that is, sensed vibrations or forces are not below one or more thresholds, the damping system 22 may provide a correction factor to the controller output at least with regard to input signals having one or more parameters like that which caused the monitored output. In this way, a future, similar input signal would cause the controller 32 to provide an output signal modified by the correction factor with the goal of achieving an improved damping. The damping system 22 could use both closed loop and open loop control schemes. For example, a closed loop control scheme could be used for initial damping and an open loop scheme could be used only when the damping achieved by the closed loop control scheme was outside of a threshold indicating improved damping is desired.

Accordingly, active vehicle damping systems 22 and methods are disclosed herein. These active damping systems 22 and methods are configured to actively damp, at least partially offset or cancel out vibrations or forces in the vehicle frame 14. One benefit of these systems and methods is decreased noise/vibration/harshness (NVH), thereby providing a smoother vehicle ride and making vehicle passengers more comfortable. Further, the damped vibrations and smoother ride can enable greater vehicle range for an electric vehicle 10.

In at least some implementations, an active damping system 22 for an electric motor driven vehicle having front wheels 16*a*-*b* spaced apart in the cross-car direction and coupled to the vehicle by suspension components 18, includes a first sensor 24, a first actuator 30, and a controller 32 coupled to or communicated with both the first sensor 24 and the first actuator 30. The first sensor 24 is associated with a front wheel 16*a* or 16*b* and/or the suspension assembly 18 for that front wheel 16*a*, or 16*b*. The first actuator 30 is coupled to the vehicle frame 14 and has a movable mass, such as an armature 34, driven by the first actuator 30. The controller 32 is configured to receive the output from the first sensor 24 and, in response to at least an output from the first sensor 24 that is beyond a threshold, to provide an output to the first actuator 30 to displace the movable mass and at least partially damp vibrations in the vehicle. The threshold may be set with regard to one or more parameters of the force including but not limited to magnitude and direction.

In at least some implementations, one or more sensors 24 are associated with each front wheel of the vehicle. And multiple actuators 30 may be provided and controlled individually or together as a function of the force sensed by these one or more sensors 24. The system may be configured to damp vibrations that may occur, for example, due to one or more rear wheels 16*c-d* of the vehicle 10 encountering a road condition previously encountered by one or more front wheels 16*a-b*, and/or to reduce the duration or magnitude of forces on the vehicle frame 14 that exist after the front wheels 16*a-b* encounter a road condition.

In at least some implementations, the output from the controller 32 is a function of the output from one or more of the sensors 24 associated with the suspension 18 of one or more vehicle wheels 16, and one or more of: a vehicle speed sensor; a steering angle sensor, a tire pressure sensor; one or more sensors that provide an indication of vehicle weight; and a temperature sensor.

Figure 3:
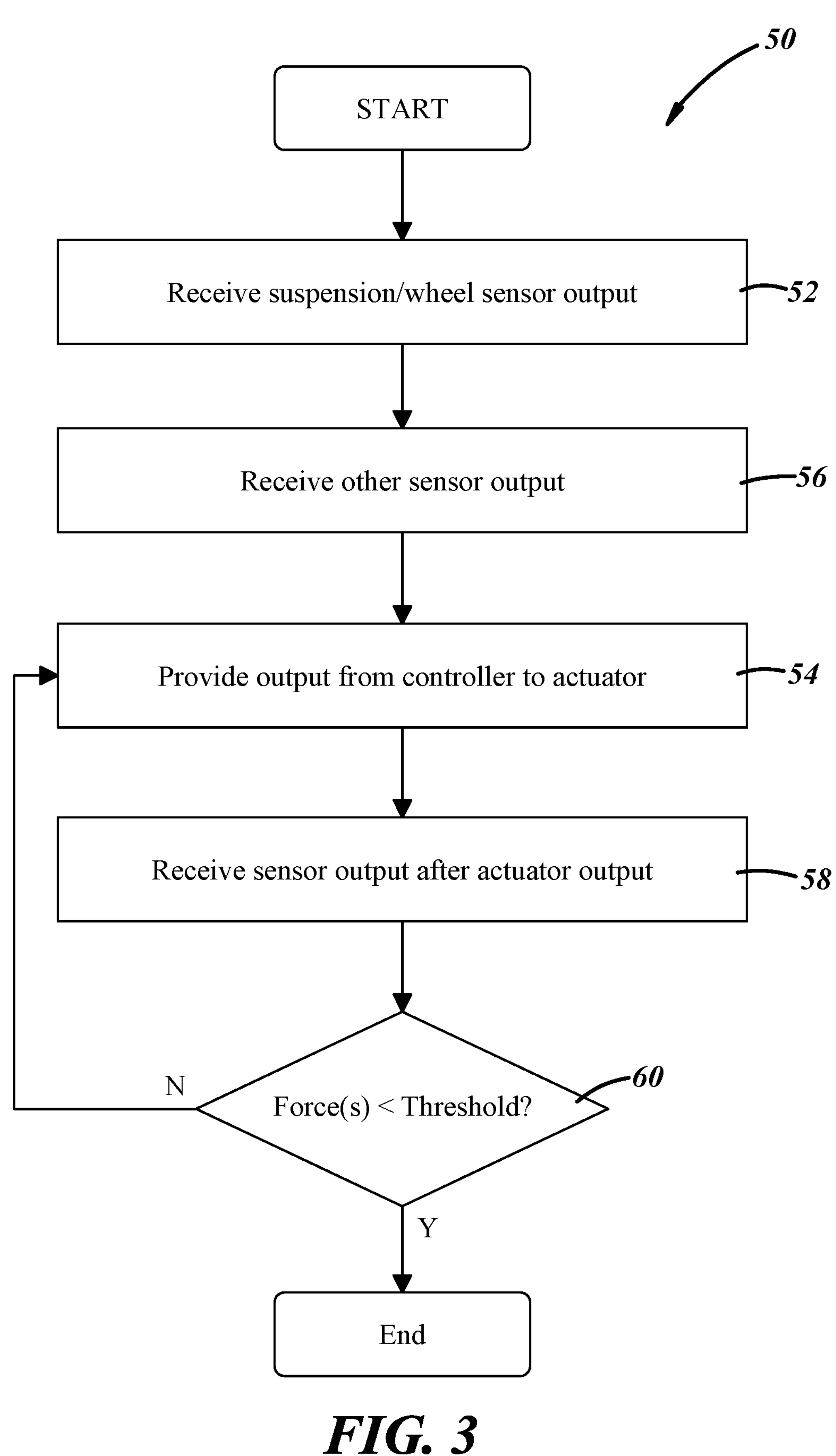
FIG. 3 is a flow chart of a method for damping forces or vibrations within a vehicle frame 14.

The actuator(s) 30 may be controlled any suitable control scheme or method. FIG. 3 is a flowchart of one example of a control method 50. In at least some implementations, the method 50 of controlling an actuator 30 to damp forces in a vehicle, includes the steps of:

- sensing a force with a first sensor 24 coupled to one or both of a first front wheel 16*a* or a suspension assembly 18 for the first front wheel 16*a;*
- communicating the force with a controller 32 at step 52; and
- providing an output from the controller 32 at 54, at least when the force exceeds a threshold, to a first actuator 30 coupled to the vehicle and having a movable mass 34 driven by the first actuator 30, whereby the output from the controller 32 causes the first actuator 30 to displace the movable mass 34 and at least partially damp vibrations in the vehicle.

The output from the controller 32 may be a function of the output from the first sensor 24 and optionally, in step 56, from one or more of: a vehicle speed sensor, a steering angle sensor, a tire pressure sensor, one or more sensors that provide an indication of vehicle weight, and a temperature sensor, among other possible sensor types. And the output/control of the actuator(s) 30 may be done in a closed loop scheme, open loop scheme or both. The actuators 30 may be actuated until the forces/vibrations in the frame 14 are brought below a threshold, which may be a combination of thresholds relating to, for example, magnitude and frequency of vibrations. Further, in step 58, the effect of the actuator output from step 54 can be determined via sensor(s) 24 and/or 26 and further actuator output may be provided if the forces in the vehicle were not sufficiently damped, that is, if the forces in the vehicle after actuation of the actuator are not below at least one threshold, which may be determined in step 60.

Further, as generally shown in FIG. 1, multiple actuators 30 may be provided on the vehicle, at any desired location. Each actuator 30 may be driven by the controller 32 as a function of the output from any desired sensor. Further, the output provided from the controller 32 to each actuator may be the same or different, as desired. The forces within the frame 14 can be different in different areas of the frame 14 such that provide different outputs to different actuators 30 more effectively damps the forces experienced in different areas of the frame 14. Accordingly, the output provided to each actuator 30 may be a function of the sensor outputs to the controller as well as the actuator's location.

What is claimed is:

1. An active damping system for an electric motor driven vehicle having front wheels spaced apart in a cross-car direction and coupled to the vehicle by suspension components, and rear wheels spaced from the front wheel in a fore-aft direction, the system comprising:

- a first sensor coupled to one or both of a first front wheel or a suspension assembly for the first front wheel, the first sensor providing an output indicative of a force on a component to which the first sensor is coupled;
- a first actuator having a housing rigidly coupled to a vehicle frame at a location spaced in one or both of the fore-aft direction and the cross-car direction from the first front wheel and the suspension assembly for the first front wheel, the first actuator having a movable mass driven by the first actuator, the movable mass includes a magnet and a ferromagnetic component coupled to the magnet, and the first actuator includes a wire coil; and
- a controller configured to receive the output from the first sensor and the controller is configured, in response to at least an output from the first sensor that is beyond a threshold, to provide electricity to the wire coil of the first actuator to displace the movable mass and apply forces directly to the vehicle frame at the location to at least partially damp vibrations in the vehicle due to force provided to the vehicle frame by the movement of the movable mass relative to the vehicle frame.

2. The system of claim 1 which also comprises a second sensor coupled to one or both of a second front wheel or a suspension assembly for the second front wheel, the second sensor providing an output to the controller where the output is indicative of a force on a component to which the second sensor is coupled, and a second actuator coupled to the vehicle and having a movable mass driven by the second actuator, and wherein the controller is configured to receive the output from the second sensor and the controller is configured, in response to at least an output from the second sensor that is beyond a threshold, to provide an output to the second actuator to displace the movable mass and at least partially damp vibrations in the vehicle.

3. The system of claim 2 wherein the controller is configured to provide an output to either or both of the first actuator and the second actuator in response to an output from at least one of the first sensor and the second sensor that is beyond a threshold.

4. The system of claim 1, wherein the wire coil surrounds the movable mass, and when electricity is provided to the wire coil, the movable mass is displaced by an electromagnetic field of the first actuator.

5. The system of claim 1, wherein the magnet is a rare earth magnet.

6. The system of claim 1 wherein the first actuator is coupled to the vehicle frame at a location between a rear of the vehicle and the first sensor.

7. The system of claim 1 which also includes a vehicle speed sensor having an output communicated with the controller, and wherein the output from the controller is a function of the output from the first sensor and from the vehicle speed sensor.

8. The system of claim 1 which includes a tire pressure sensor having an output communicated with the controller, and wherein the output from the controller is a function of the output from the first sensor and from the tire pressure sensor.

9. The system of claim 1 which includes one or more sensors that provide an indication of vehicle weight, wherein the output of the one or more sensors is communicated with the controller, and wherein the output from the controller is a function of the output from the first sensor and from the one or more sensors.

10. The system of claim 1 which also includes a second sensor associated with the actuator and arranged to provide an output to the controller indicative of a force on the actuator or an area adjacent to the actuator.

11. The system of claim 1 wherein the housing is fixed to the vehicle frame at a location spaced rearwardly from the first front wheel or the suspension assembly for the first front wheel such that forces provided from the first actuator, as a result of movement of the movable mass, are provided directly to the vehicle frame and are not provided directly to the first front wheel or the suspension assembly for the first front wheel.

12. The system of claim 11 wherein the housing is coupled to the vehicle frame so that the natural frequency of the first actuator when connected to the vehicle frame is greater than the highest operating frequency of the actuator.

13. The system of claim 11 wherein the first actuator includes a shaft coupled to the housing, and wherein the movable mass includes a passage through which the shaft is received and so that movement of the movable mass is guided by the shaft.

14. A method of controlling an actuator to damp forces in a vehicle, comprising the steps of:

sensing a force with a first sensor coupled to one or both of a first front wheel or a suspension assembly for the first front wheel, wherein the vehicle includes a second front wheel spaced from the first front wheel in a cross-car direction, and the vehicle includes two rear wheels spaced rearwardly from the first front wheel and the second front wheel in a fore-aft direction;

communicating the force with a controller; and providing an output from the controller, at least when the force exceeds a threshold, to a first actuator coupled to a vehicle frame at a location spaced rearwardly from the first front wheel and the suspension assembly for the first front wheel and having a movable mass driven by the first actuator, whereby the output from the controller causes the first actuator to displace the movable mass and at least partially damp vibrations in the vehicle frame by providing force from the first actuator, as a result of movement of the movable mass, directly to the vehicle frame at the location.

15. The method of claim 14 wherein the output from the controller is a function of the output from the first sensor and from one or more sensors indicative of a vehicle speed, tire pressure, vehicle steering angle, and vehicle weight, and wherein the output from the controller is provided to offset forces in the vehicle frame associated with a rear wheel of the vehicle encountering a road condition that the first front wheel has already encountered.

16. The method of claim 14 wherein the output from the controller is adjustable in an open loop control scheme based upon an output sent to the controller from a second sensor associated with the first actuator.

17. The method of claim 16 wherein, if the output from the second sensor indicates a force above a threshold exists at the second sensor after the first actuator has been actuated, then the controller provides another output to actuate the first actuator again.

18. The method of claim 14 wherein a second sensor coupled to one or both of the second front wheel or a suspension assembly for the second front wheel, and which includes communicating the output from the second sensor with the controller and wherein the controller provides an output to the first actuator as a function of the output from both the first sensor and the second sensor.

19. The method of claim 18 which includes a second actuator and wherein the controller provides an output to the second actuator to actuate the second actuator as a function of the output from both the first sensor and the second sensor.

20. The method of claim 19 wherein the output provided to the second actuator is different than the output provided to the first actuator.

* * * * *